(No Model.) 8 Sheets—Sheet 1.
W. H. CLARK.
CASH REGISTER.

No. 506,471. Patented Oct. 10, 1893.

Fig. 1.

Witnesses
F. Einfeldt
F. J. Bassett

Inventor
William H. Clark
By A. Stevgren
Atty.

(No Model.)

W. H. CLARK.
CASH REGISTER.

Patented Oct. 10, 1893.

Fig. 2.

Witnesses
F. Einfeldt
F. J. Barrett

Inventor
William H. Clark
By L. C. Sturgeon
Atty.

(No Model.) 8 Sheets—Sheet 3.
W. H. CLARK.
CASH REGISTER.

No. 506,471. Patented Oct. 10, 1893.

Fig. 3.

Witnesses
F. Einfeldt
F. J. Barrett

Inventor
William H. Clark
By H. O. Sturgeon
Atty.

(No Model.) 8 Sheets—Sheet 7.

W. H. CLARK.
CASH REGISTER.

No. 506,471. Patented Oct. 10, 1893.

Witnesses
F. Einfeldt.
F. J. Barnett

Inventor
William H. Clark
By Geo. Sturgeon
Atty.

(No Model.) 8 Sheets—Sheet 8.

W. H. CLARK.
CASH REGISTER.

No. 506,471. Patented Oct. 10, 1893.

Witnesses
F. Einfeldt
F. J. Barrett

Inventor
William H. Clark
By [signature]
Atty.

UNITED STATES PATENT OFFICE.

WILLIAM H. CLARK, OF ERIE, PENNSYLVANIA, ASSIGNOR TO THE ERIE CASH REGISTER COMPANY, OF SAME PLACE.

CASH-REGISTER.

SPECIFICATION forming part of Letters Patent No. 506,471, dated October 10, 1893.

Application filed March 17, 1893. Serial No. 466,546. (No model.)

*To all whom it may concern:*

Be it known that I, WILLIAM H. CLARK, a citizen of the United States, residing at the city of Erie, in the county of Erie and State of Pennsylvania, have invented certain new and useful Improvements in Cash-Registers; and I do hereby declare the following to be a full, clear, and exact description of the invention, such as will enable others skilled in the art to which it appertains to make and use the same, reference being had to the accompanying drawings, and to the letters and figures of reference marked thereon, forming part of this specification.

My invention consists in the improvements in cash-registers hereinafter set forth and described, and illustrated in the accompanying drawings in which—

Heretofore in the construction of cash-registers, the registering and indicating mechanism of the machine, has been operated entirely by the key levers during the downward movement of the same.

In my invention hereinafter described, the mechanism is only started into operation by the action of the key levers, and is thereafter actuated by a spring shaft which is geared to and operates large gear wheels at each end of the machine, which gear wheels, when released by the operation of the key levers, operate when rotated by the spring shaft in one direction to open the drawer, to raise the tablet rod corresponding to the key operated, and to move that portion of the registering mechanism communicating with the tablet rod so raised, and when rotated in the opposite direction, these wheels operate to actuate the carrying mechanism of the machine, so that the registry and addition of the sum indicated, to the sum already registered is completed; the registry of the amount indicated being only completed when the drawer is fully closed. In this manner, I am enabled to perform the operation of carrying the tens from one registering wheel to another, by positive and direct mechanism entirely independent of the keys or key levers of the machine, as the keys only operate to start the indicator tablets up a short distance and then to release the gear wheels, which operate thereafter automatically to indicate and register the amount desired.

In the accompanying drawings, I show a construction of my improved cash-register illustrating my invention, in which A A' are the end frames of the machine. These end frames I secure to a base B, the upper parts thereof being also connected together by longitudinal bars C C' and by the several longitudinal rods hereinafter specifically referred to, upon which the rotating mechanism of the machine is mounted.

Figure 2:
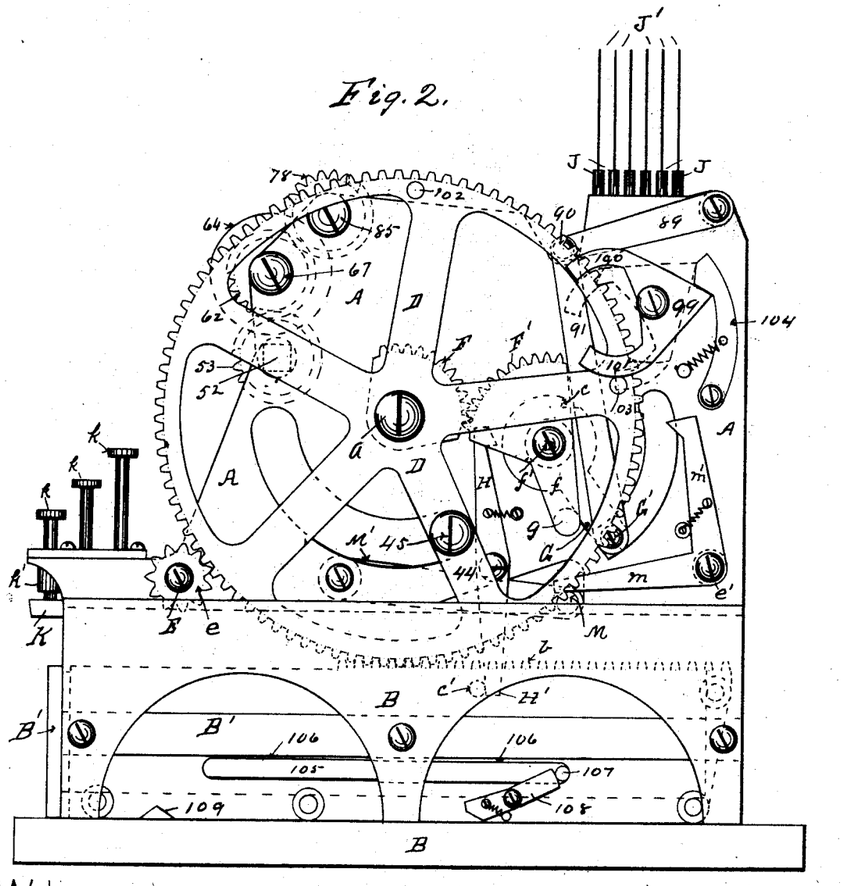
Fig. 2. is a view in elevation of the right hand end of the same.
Figure 3:
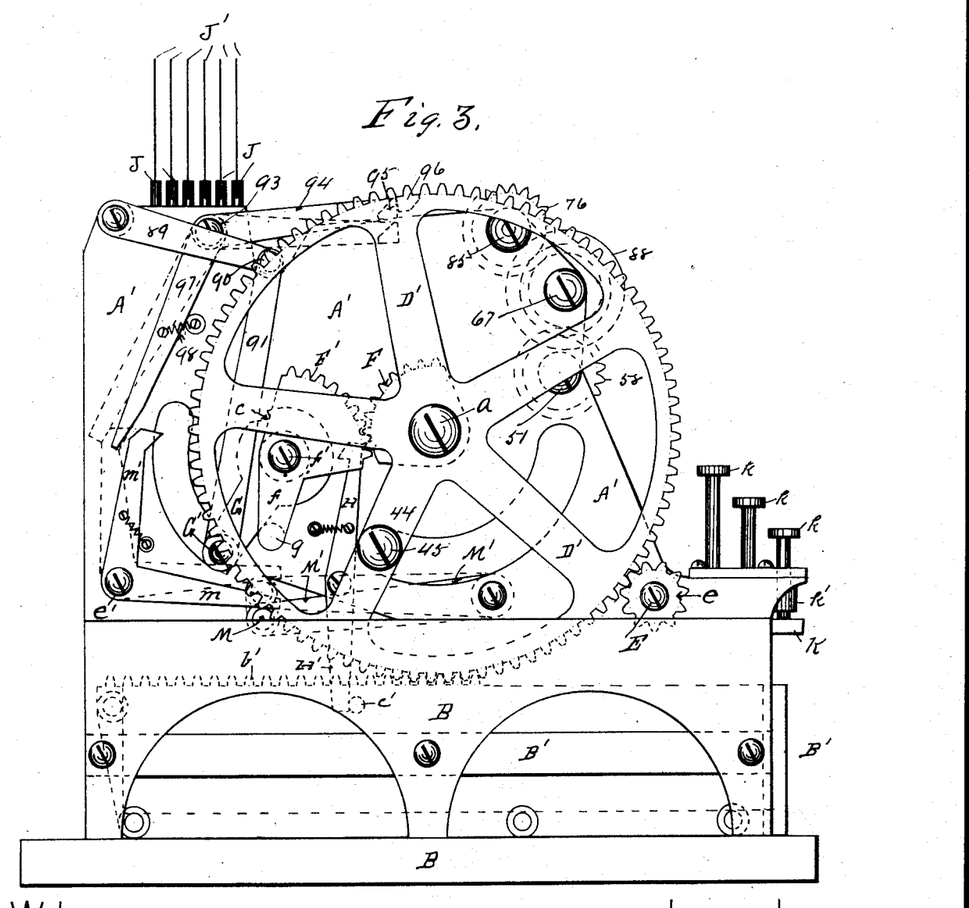
Fig. 3. is a view in elevation of the left hand end of the same.

In the base B of the machine, I place an ordinary cash-drawer B' adapted to move in and out in the usual manner; on bearings $a$ on the ends of a longitudinal rod $a'$, I mount large gear wheels D D' at each end of the machine frame; these wheels intermesh with rack gears $b\ b'$ on the drawer B' in the base B of the machine frame. Across the frame, I also mount a shaft E provided with a spring E' for actuating it in one direction, and also provided with spur gears $e\ e$ on the ends thereof, which intermesh with and actuate the gear wheels D and D', which in turn operate the cash-drawer B' as hereinafter described. Secured to the inside of the hub of each of the gear wheels D and D' is a segment of gearing F, each of which segments intermeshes with a like segment F' on the hub of a lever f mounted on a stud f' on the machine frame; on each of these studs f' inside of the levers f thereon, I mount a lever G adapted to be engaged by inwardly projecting studs g on the ends of the levers f, so that the raising of the levers f by the rotation of the wheels D and D' operates to simultaneously raise the levers G in unison therewith. The ends of the levers G are connected together by a longitudinal rod G' as and for the purpose hereinafter set forth; the hubs of the levers G are also provided with notches c shown in dotted lines in Figs. 2 and 3, and pivoted to the ends of the machine frame are spring actuated hooked levers H adapted to engage with said notches c when the cash-drawer B' is opened and remain so engaged, until the cash-drawer is fully closed, when the hooked ends of the levers H are disengaged therefrom by means of studs c' on the sides of the cash-drawer B' contacting with the downward projecting arms H' of said levers H, so that the levers G and the rod G' connecting the same when in a raised position cannot be released as hereinafter described, so as to return to their normal positions, until the cash-drawer B' is fully closed.

The tablet carriers I are placed in groups 1, 2, 3, 4, and 5; the tablet carriers in the first group corresponding to and communicating with the key levers indicating cents, from one to nine inclusive; the second group with the key levers indicating multiples of five cents, from fifteen to seventy-five inclusive; the third group, with the key levers indicating ten cents and multiples thereof, from ten to ninety inclusive; the fourth group, with the key levers indicating dollars, from one to nine inclusive, and the fifth group, with the key levers indicating ten dollars and multiples thereof, and also the change key. These tablet carriers I, I preferably construct each of a lower section I' which consists of a rectangular frame, in the upper end of which, I secure a tablet rod J supporting a tablet J', this rod J moving vertically through a hole in the cross bar C of the frame, while the rectangular frame I' secured to the lower end of the rod J embraces the cross bar C' of the frame and moves vertically in grooves in the edges thereof; near the lower end of this rectangular frame I' is a lug or projection i extending inward from the rear portion i' of said frame, so as to form a slot or recess j between the same and the bottom j' of said rectangular frame I', and on the front lower corner of said frame I' is a lug or projection h which extends outwardly therefrom, as and for the purpose hereinafter set forth.

Figure 10:
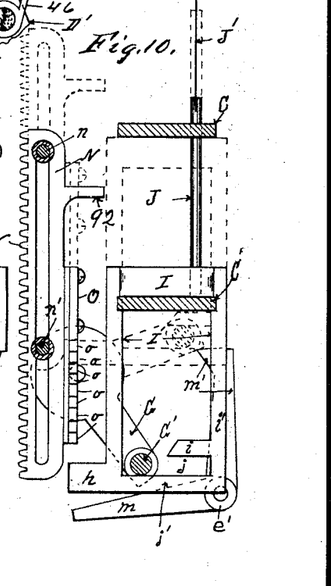
Fig. 10. is an end view in elevation *inter alia,* of the same.
Figure 11:
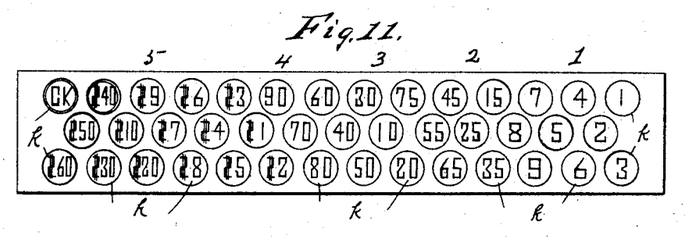
Fig. 11. is a top or plan view of the key-board of my improved cash-register.

Through the rectangular openings within the frame I' forming the lower portions of the tablet carriers I the rod G' which connects the ends of the levers G as hereinbefore described, passes, (see Figs. 5, 6, and 10,) which rod normally rests upon the inside of the bottom j' of the frames I' and when any one of the tablet carriers I is raised slightly above its normal position, the rod G' passes under the point of the projection i, and when moved on upward, carries the tablet carrier so engaged up with it, to the full height of the traverse of the tablet carrier.

Figure 5:
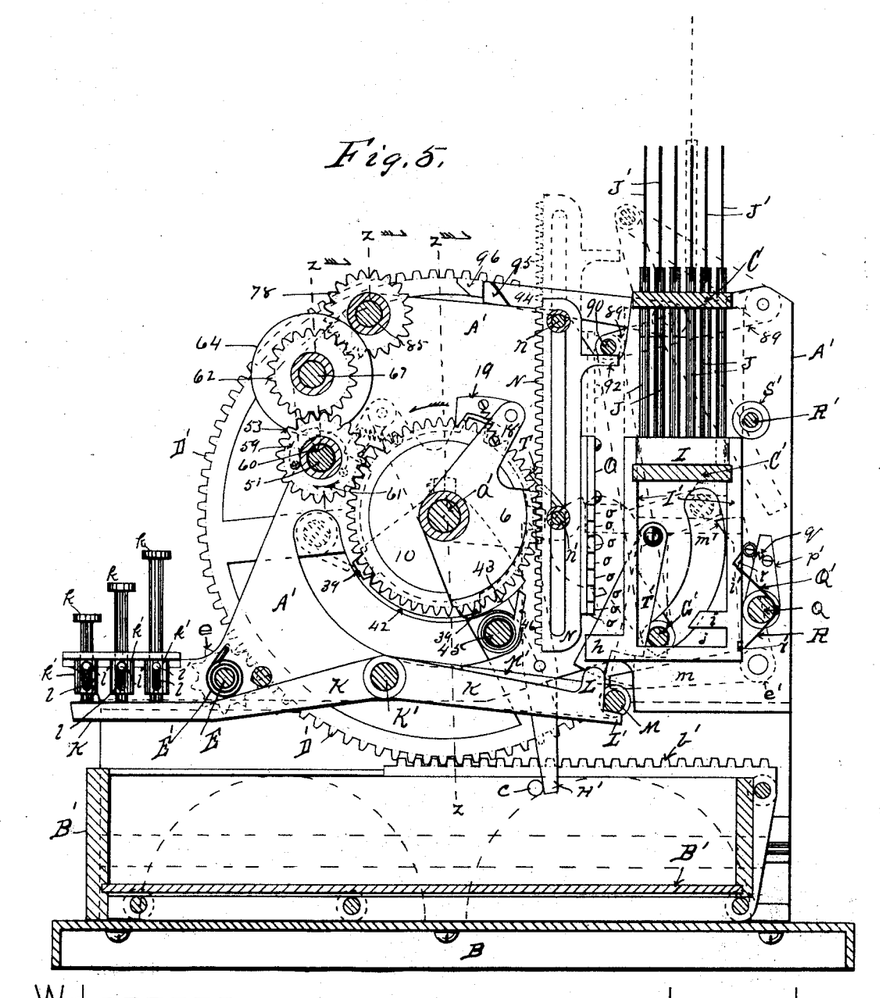
Fig. 5. is a transverse section of the same on the line $x, x,$ in Fig. 1, looking in the direction of the arrows.
Figure 6:
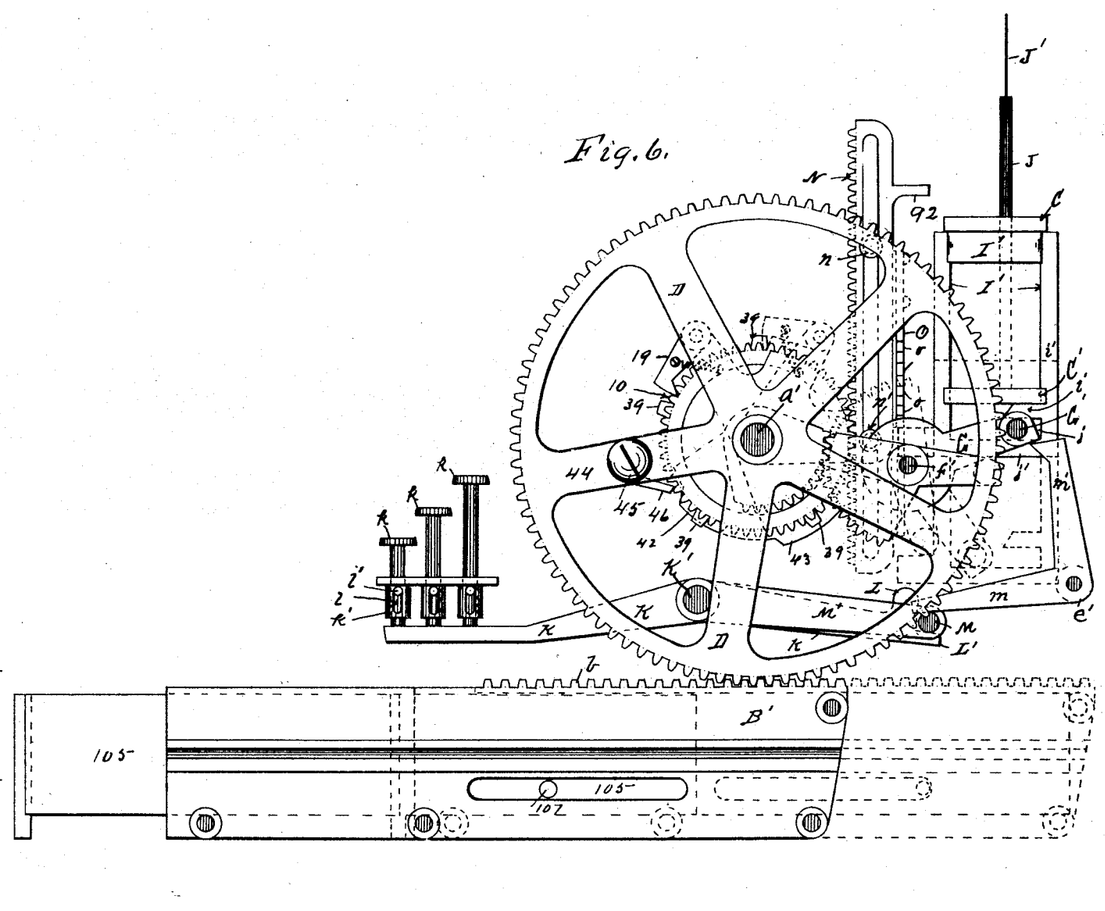
Fig. 6. is a detail end view of same in elevation with the frame removed and one of the indicating tablets raised.
Figure 7:
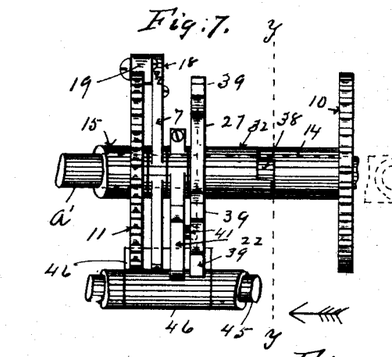
Fig. 7. is a detail view in elevation of a section of the carrying mechanism of my improved cash-register.

In the lower part of the machine frame, I pivot horizontal key levers K on a rod K' shown clearly in Figs. 5 and 6. Over the front ends of these key levers, I place push buttons k, one of which rests upon each key lever. These push buttons k are each provided with a number on the top thereof indicating some amount, and the stems of the buttons operate in sleeves k' each having a slot l in which a stud pin l' on the stem of the button moves, which operates to limit the movement thereof. The rear end of each of the key levers is provided with an upwardly projecting lug or boss L adapted to contact with the projection h on the corresponding tablet carrier I. When the rear end of such key lever is raised, by pressing the button k communicating with the front end thereof, it raises such tablet carrier up a sufficient distance to carry the rod G' into the slot j therein. There is also on the rear end of each key lever a horizontal projection L' upon which a rod M rests; this rod M connects the ends of two horizontal arms M' one at each end of the machine frame, and pivoted on the rod K', so that the rod L rests upon and is common to all of the key levers K.

At each side of the rear of the machine frame, is pivoted a bell-crank lever e', the horizontal arms m of which extend over and rest upon the ends of the rod M, and the vertical arms m' thereof extend upward in such position, that when the rod G' is being raised it throws the arms m' back until it has passed above them, when the arms m' move back to their normal position. Their upper ends then being under the ends of the rod G' operate as supports for it, and retain it together with the tablet carrier raised thereby in a raised position, until some one of the key levers K is again operated, which raises the rod M and the arms m of the bell-crank levers e resting thereon, sufficiently to throw the arms m' thereof back out from under the rod G', so as to permit it together with the tablet carrier I supported thereby to fall by gravity to their normal positions.

Figure 9:
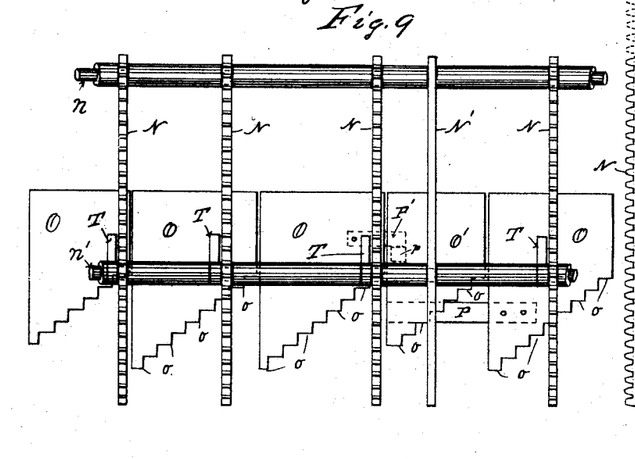
Fig. 9. is a detail view in elevation of the rack-gear mechanism for actuating the registering wheels.

Directly in front of each of the groups 1, 3, 4 and 5 of tablet carriers, I mount a vertically sliding rack-gear N and in front of the group 2 of tablet carriers, I mount a vertically sliding guide N', these racks and this guide being centrally slotted and mounted in grooves in rods n and n' passing through these slots and secured in the ends A A' of the machine frame. To the rear of each of these racks N, I secure a plate O and to the guide N' I secure a plate O', each of which plates is provided in its lower edge with steps o, see Figs. 5 and 10; there being a step o thereon opposite each of the tablet carriers I, the plates being so located that there is a plate O directly in front of each one of the groups of tablet carriers, and vertically directly over the projecting lugs h thereon, so that as each tablet carrier I is being raised, the lug h thereon, engages the step o in the plate opposite it, and raises with it the plate O and the rack N to which it is secured, or the plate O' and the guide N' to which it is secured, as the case may be; by referring to Fig. 9 it will be seen that there is an arm P secured to the back of the plate O in front of section 1, which arm extends entirely across the rear of the plate O' in front of section 2, the lower edge of this arm P being even with the fifth step o on the plate O', so that in the raising of the plate O' to its full height by any of the tablet carriers I in the second section, the lug h on the tablet carrier operated, not only contacts with the steps o on the plate O', but with the arm P, so as to raise the plate O opposite the first section and the rack N secured thereto up with the section O' a distance equal to five of the steps o. On the back of the plate O in front of the third section is an arm P' (shown in dotted lines in Fig. 9), which extends a short distance behind the plate O', which is provided with a lug p adapted to contact therewith, so that the raising of the plate O' carries the said plate O opposite the third section and the rack N secured thereto up the same number of steps the plate O' is raised. The purpose of this construction, is to utilize the registering mechanism hereinafter described, communicating with rack bars N N on sections 1 and 3, for registering the amounts indicated by the tablets in section 2, as there is no independent registering mechanism connected with section 2.

Figure 4:
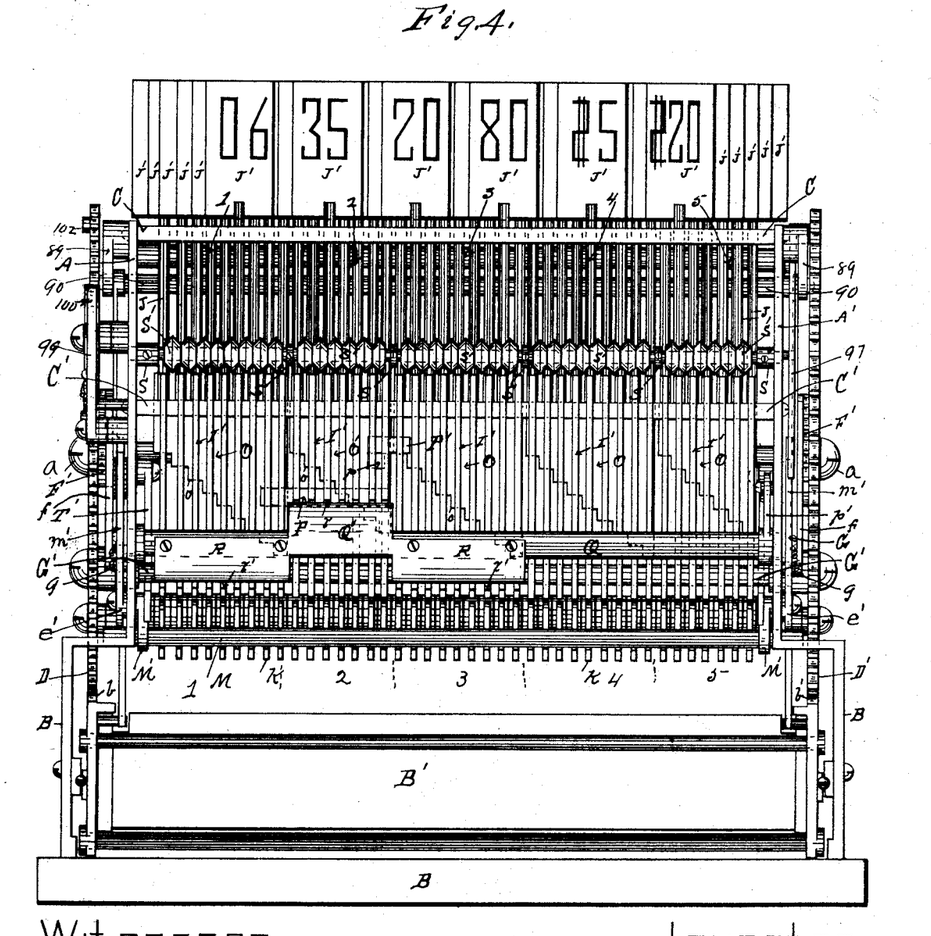
Fig. 4. is a view in elevation of the rear of the same.

At the rear of the machine (see Figs. 4 and 5) is a rock shaft Q provided at one end with an upwardly projecting arm p' having a retracting spring q thereon; secured to this rock shaft opposite section 2 of the tablet carriers is an upwardly projecting plate Q' the upper end of which is normally in the notches r in the rear portions i' of the frames I' of the tablet carriers I of said second section. To this rock shaft Q are also secured downwardly projecting plates R, one of which is opposite section 1 and the other opposite section 3 of the tablet carriers, and in the rear edges of the parts i' of the tablet carrier frames I' in these sections, are notches r' adapted to engage the lower edges of the plates R when they are rocked inwardly into contact therewith by the operation of raising any one of the tablet carriers I in section 2. This feature is duly illustrated in Figs. 4 and 5, and by means thereof, the raising of any one of the tablet carriers I in the second section, locks the tablet carriers I in sections 1 and 3 down, until such tablet carrier in section 2 is returned to its normal position.

Across the rear of the machine frame, just above the tops of the rear portions i' of the tablet carrier frames I', I secure a rod R', so that the carrier frames I' will just pass up in front of it. On this rod R' I secure collars S between each section of tablet carriers and outside of the sections 1 and 5 thereof, and between these collars S, I place loose beveled buttons S', said buttons so filling the space between the collars S opposite each section, that there is just sufficient room left for one tablet carrier frame I' to pass up at the same time between the buttons S' opposite the section in which such carrier frame I' is being raised, thus preventing the raising of more than one tablet carrier in any one section at the same time.

Figure 1:
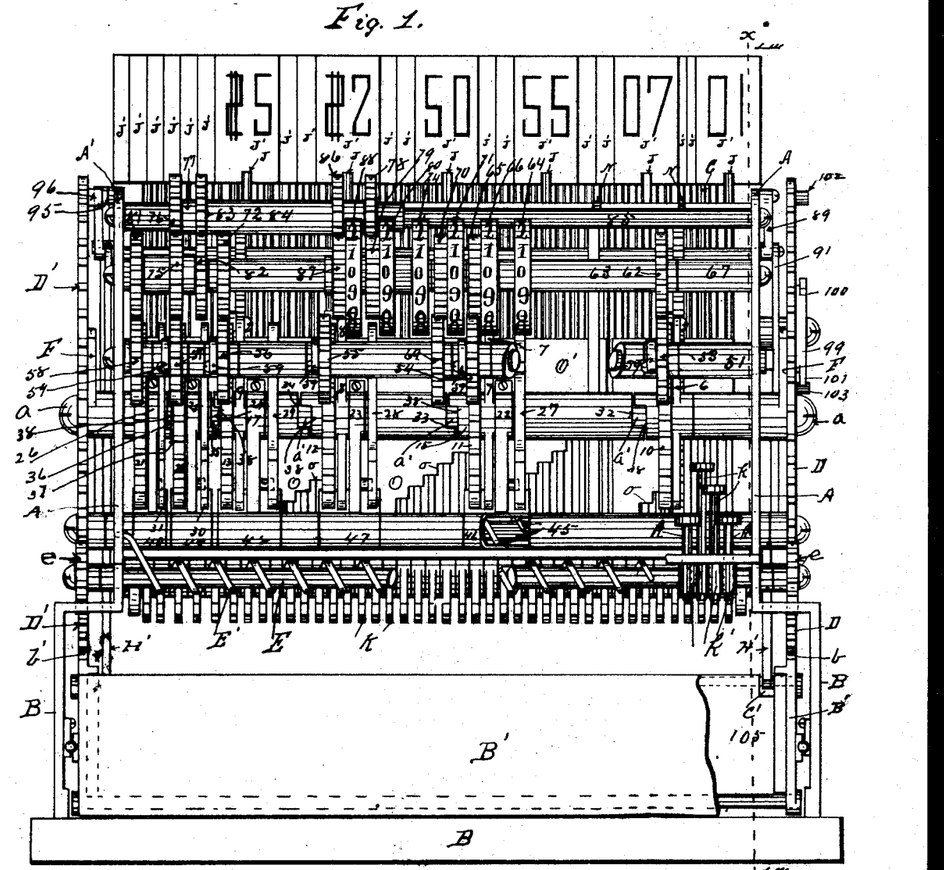
Figure 1. is a view in elevation of the front of my improved cash-register, with parts thereof broken away.
Figure 12:
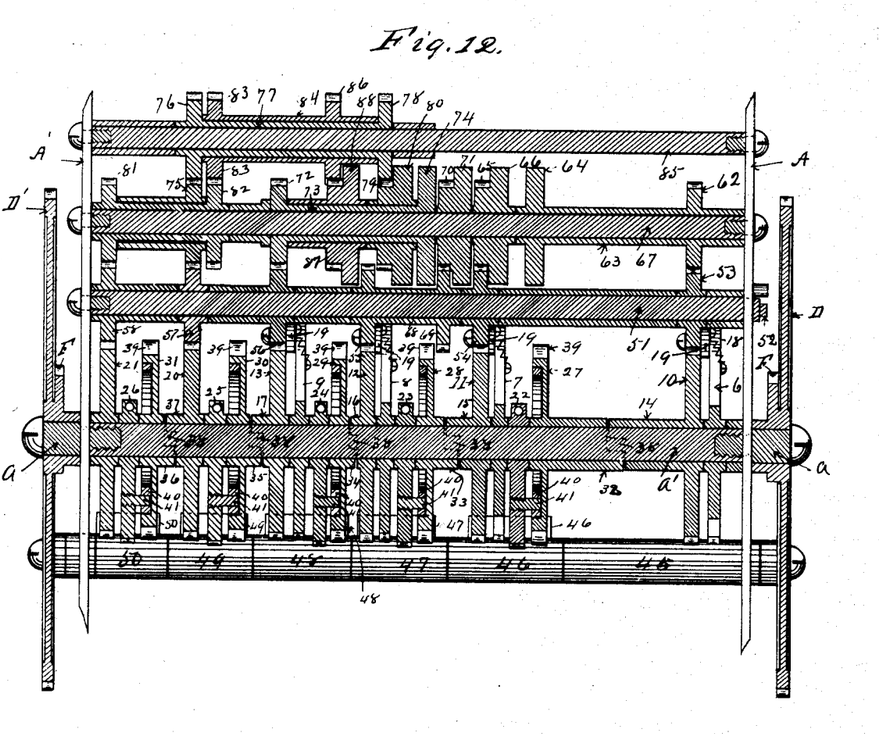
Fig. 12. is a vertical longitudinal detail section of the registering and carrying mechanism of my cash-register on the lines $z, z, z,$ in Fig. 5, looking in the direction of the arrows.

On the rod a' forming the axis of the wheels D D', I mount segments of gearing 6, 7, 8 and 9, so that they will rotate freely thereon, see Figs. 1 and 12, each of these segments of gearing intermeshing with one of the vertically moving rack bars N, as illustrated in Figs. 5 and 6. On the rod a' at one side of and immediately adjacent to each of the segments 6, 7, 8 and 9, I mount geared register wheels 10, 11, 12 and 13. These wheels are provided with sleeves 14, 15, 16 and 17, which, together with the gear wheels secured thereto, are adapted to rotate freely on the rod a'. On each of the segments 6, 7, 8 and 9, is an arm 18, which is provided with a spring actuated dog 19 pivoted thereto and engaging the teeth of the register wheels 10, 11, 12, 13, as the segments to which said dogs are pivoted are rotated by the raising of the rack bars N, and turning said register wheels forward the distance the said segments are rotated in that direction, the said dogs, however, passing over the teeth of the register wheels when said segments are rotated in the opposite direction by the downward movement of the rack bars N; pawls T on the rod n' engaging the teeth of the register wheels, and preventing the backward movement thereof. On the rod a' at the left of the register wheel 13, I mount additional register wheels 20 and 21, which are operated as hereinafter set forth; these register wheels 10, 11, 12, 13, 20 and 21, each preferably contain fifty teeth, 10 and 11 registering cents, and 12, 13, 20 and 21 registering dollars.

Figure 13:
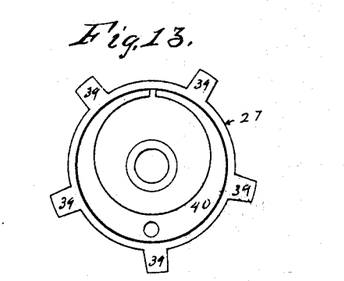
Fig. 13. is a detail view in elevation of a portion of the same.

On the rod a' adjacent to each of the register wheels 11, 12, 13, 20 and 21, I clamp fixed segmental guides 22, 23, 24, 25 and 26, the peripheries of which are extended over a space preferably equal to fifteen teeth in the registry wheels, and adjacent to these fixed guides, I mount loosely on the rod a' rotating guide disks 27, 28, 29, 30 and 31. Said rotating guide disks are provided with sleeves 32, 33, 34, 35 and 36, which interlock with the ends of the sleeves 14, 15, 16, 17 and 37 of the register wheels 10, 11, 12, 13 and 20, there being sufficient play in each of these interlocking joints 38 to allow the rotating guide disks to be moved forward one fifth of a revolution without moving the register wheels communicating therewith, as and for the purpose hereinafter set forth. These rotating guide disks 27, 28, 29, 30 and 31 are each provided with five projections 39 equi-distant from each other and extending beyond the periphery of the teeth of the register wheels adjacent thereto; within recesses in these disks, I place circular friction springs 40, (see Figs. 12 and 13,) which friction springs are connected by stud pins 41 with the fixed segmental guides 22, 23, &c., and operate as brakes to prevent the too free movement of the disks 27, 28, &c. The first section 42 of the periphery of each of the fixed segmental guides 22, 23, &c., equals in length eight of the register wheel teeth, and projects but slightly beyond the periphery of the teeth of the register wheels, and the remaining section 43 thereof extends slightly beyond the peripheries of the projections 39 on the rotating guide disks 27, 28, &c.

Between the arms 44 of the wheels D, D', I secure a rod 45 upon which I mount spring actuated pawls 46, 47, 48, 49 and 50, the pawl 46 operating on the register wheel 11, the fixed guide 22, and the rotating guide disk 27; the pawl 47, on the register wheel 12, the fixed guide 23, and the rotating guide disk 28; the pawl 48, on the register wheel 13, the fixed guide 24, and the rotating guide disk 29; the pawl 49, on the register wheel 20, the fixed guide 25, and the rotating guide disk 30, and the pawl 50, on the register wheel 21, the fixed guide 26, and the rotating guide disk 31; this rod 45 and the pawls thereon, traveling with the wheels D and D', as they rotate in one direction when the drawer B' is being opened, and in the opposite direction as it is being closed, the distance traversed by the rod 45 and the pawls thereon being always the same.

In the ends A, A' of the machine frame, I mount a shaft 51, one end 52 of which is adapted to receive a key or wrench for turning the same, (see Figs. 1 and 12.) On this shaft I mount a loose pinion 53 intermeshing with the register wheel 10; a loose pinion 54 intermeshing with the register wheel 11; a loose pinion 55 intermeshing with the register wheel 12; a loose pinion 56 intermeshing with the register wheel 13; a loose pinion 57 intermeshing with the register wheel 20, and a loose pinion 58 intermeshing with the register wheel 21; each of these loose pinions is provided with a spring actuated dog 59, which is adapted to engage with notches 60 in said shaft 51 (shown in Fig. 5), when the shaft 51 is rotated in the direction of the arrow 61 in Fig. 5. These spur gears 53, 54, 55, 56, 57 and 58 intermesh with and operate other spur gears viz: The spur gear 53 intermeshes with and operates a spur gear 62 secured to a sleeve 63 mounted and rotating on a rod 67 which has the first cents register indicating wheel 64 thereon; the spur gear 54 intermeshes with and operates a spur gear 65 secured to the side of the second cents register indicating wheel 66 mounted on said rod 67; the spur gear 55 is secured to a sleeve 68 operating on the rod 51, and having a spur gear 69 on the opposite end thereof, which intermeshes with and operates a spur gear 70 secured to the side of the first dollar register indicating wheel 71, operating on the rod 67; the spur gear wheel 56 intermeshes with and operates a spur gear wheel 72 secured to a sleeve 73 operating on the rod 67, and having the second dollar register indicating wheel 74 on the end thereof; the spur gear wheel 57 intermeshes with a spur gear wheel 75 operating on the rod 67, which spur gear intermeshes and operates a spur gear wheel 76 secured to a sleeve 77 mounted on a rod 85 and provided with a like spur gear 78, which intermeshes with and drives a spur gear 79 secured to the third dollar register indicating wheel 80, and the spur gear wheel 58 intermeshes with and operates a spur gear 81 on a sleeve operating on the rod 67 and having another spur gear 82 thereon, which intermeshes with and operates a spur gear 83 secured to a sleeve 84 rotating on the outside of the sleeve 77, and having a spur gear 86 thereon, which intermeshes with a spur gear 87 secured to the fourth dollar register indicating wheel 88 operating on the rod 67. In this manner I am enabled to bring all of the register indicator wheels of my machine together in one place, so that the amount registered can conveniently be read thereon; this arrangement being conveniently illustrated in the drawings by the detail Fig. 12.

At the top of the rear portions of each of the end frames A, A', I pivot an arm 89, which arms project forward to a point slightly in the rear of the vertically moving rack bars N and the guides N', as illustrated in Fig. 5, the ends of these arms being connected together by a rod 90; the ends of said arms are also connected to the ends of the rod G' hereinbefore described by means of links 91, so as to move in unison therewith. On the rear of each of the vertically moving rack bars N and of the vertically moving guide N', I make a rearwardly projecting lug 92, which lugs 92 are so placed thereon, that when the rack bars N and guide N' are down in their normal positions, as illustrated in Fig. 5, the rod 90 is immediately over them, the object of this construction being, that when the rod G' and one of the rack bars N or the guide N' is in a raised position and the rod G' is released, so as to allow the tablet at that time raised to return to its normal position, the links 91 will operate to bring the rod 90 down upon the lug 92 of the rack bar or guide, so as to force it to return to its normal position simultaneously with the rod G' and the tablet supported thereby.

Near the top of the part A' of the frame, I pivot a bell-crank lever 93, one arm 94 of which extends horizontally to the side of the periphery of the gear wheel D', where it is provided with a lug 95 adapted to engage with a lug 96 (shown clearly in Fig. 5, and in dotted lines in Fig. 3) on the side of the rim of the gear wheel D' when the drawer B' is fully closed and retain the wheel D' from again opening the drawer until the catch 95 is disengaged from the lug 96 on said wheel. The other arm 97 of the bell-crank lever 93 extends downward behind the upper end of the arm $m'$ of the bell-crank lever $e'$ on the end A' of the machine frame, so that when the arm $m$ of the bell-crank lever $e'$ is raised by the operation of any one of the key levers K, as hereinbefore described, the bell-crank lever 93 is operated to release the wheel D' and permit it and the wheel D to be rotated by the spring actuated shaft E, as hereinbefore described. The arm 97 of the bell-crank lever 93 is also provided with a retracting spring 98 adapted to move the bell-crank lever 93 in the opposite direction and bring the lug 95 thereon, in engagement with the lug 96 on the wheel D'. Near the top of the other end frame A, is pivoted a reversible escapement dog 99 adapted to engage the teeth of the gear wheel D, having arms 100 and 101 thereon, which extend down over the outside of the wheel D, which wheel is provided with stud pins 102 and 103, which contact with the arms of the dog 99 and operate to reverse it at the end of the wheel's traverse; a spring actuated arm 104 operating on the heel of the dog 99 to retain it in either position. In operation, when the drawer B' is closed, the dog 99 is in the position shown in full lines (see Fig. 2), the tooth thereof on the arm 101 being in such engagement with the teeth of the wheel D, that as the drawer B' is being opened, it passes over the teeth on the wheel D freely, yet prevents the closing of the drawer, until it has been fully opened when the stud 102 on the wheel, contacts with the arm 100 of the dog, and reverses its action on the teeth of the wheel D, by bringing the tooth on the arm 100 into contact with the teeth of the wheel, which then operates to allow the wheel to be rotated in the opposite direction during the closing of the drawer B', but prevents the opening of the drawer again before it has been fully closed, and the dog 99 again reversed by the stud 103 contacting with the arm 101 thereof.

In the drawings, (see Fig. 2,) I have shown a telescopic drawer, an inner section 105 thereof, operating within the outer drawer B'. In the side of the outer drawer B', I make a slot 106 of the length I desire the inner section 105 to travel, and on the rear end of the inner section 105, I secure a stud pin 107, which projects outward through the slot 106 in the outer drawer, and on the outside of the outer drawer B', I centrally pivot a spring actuated latch or lever 108, which, when both sections of the drawer are closed, engages with the stud pin 107, and retains the section 105 within the section B'. On the base B of the frame, I secure a lug 109, which lug is so located, that as the outer drawer B' reaches nearly the end of its outward traverse, the heel of the latch or lever 108 passes up thereon, so as to disengage it from the stud pin 107, when the inner section 105 of the drawer can be pulled out in the usual manner, the object of this construction, being to enable the cash-drawer to pass farther out of the machine frame, and thereby become more convenient of access.

Figure 8:
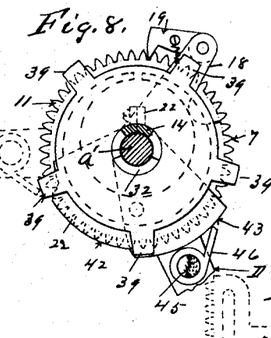
Fig. 8. is a transverse section of the same on the line $y, y,$ in Fig. 7, looking in the direction of the arrow.

In operating this machine, the drawer is opened by operating one of the keys as hereinbefore described, and a key or wrench is then placed upon the end of the shaft 51, which is then rotated until the cents register indicating wheel 64 indicates 0 at the reading line, and the remaining register indicating wheels 9 at the reading line; then the drawer is closed, which operates as hereinafter described, to carry forward each of the register wheels 11, 12, 13, 20 and 21 one tooth, so that at that time all of the register indicating wheels indicate 0 at the reading line, and the clutch joint 38 between each register wheel and the rotating guide disk to the left of it is in such position, that each register wheel can be moved forward nine teeth without rotating the guide disk, each of said guide disks being at that time in the relative position to its adjacent fixed guide, shown in Figs. 5 and 8, so that the pawls 46, 47, &c., are kept out of contact with the teeth of the register wheels 11, 12, &c. Now supposing the operator desires to register any sum, for example, nine cents, he presses the 9 cent key, which first raises the rod M sufficiently to operate the bell-crank lever M' far enough to release the rod G', which allows it, together with the tablet carrier I then up, and the rack bar N or the guide N' supported by said tablet carrier to fall by gravity to their normal positions; the rear end of said key meanwhile moving on upward, the lug L on the rear end of said key lever has contacted with the projection $h$ on the 9 cent tablet carrier, and as the rear end of said key lever moves on upward, it starts the said tablet carrier upward sufficiently to carry the rod G' into the outer part of the slot $j$ in the lower portion of said tablet carrier, and just at this instant the bell-crank lever $e'$ has been operated far enough by the rod M to disengage the bell-crank lever 93 from the large gear wheel D'. At this point the traverse of the key lever ceases; the gear wheels D and D' then taking up the work and carrying the rod G' and the 9 cent tablet carrier on upward, the lug $h$ on the lower part of the tablet carrier frame I' meanwhile having engaged the 9 cent step $o$ in the stepped plate O opposite the first section, and carried it, together with the rack bar N secured thereto upward, which movement of said rack bar N rotates the segment 6 intermeshing therewith, which in turn moves the register wheel 10 forward nine teeth; the dog T meanwhile engaging the teeth of said register wheel and preventing any backward movement thereof. This operation has moved the first cents registering wheel forward nine teeth, which amount now is indicated at the reading line on the corresponding register indicating wheel 64. Now, the operator again closes the drawer, and desiring to register another sum, say; seven cents, he presses the 7 cent key, which operates the key lever as hereinbefore described, to first release the 9 cent tablet then up, and allow it to return to its normal position, after which it starts the 7 cent tablet carrier up, when its traverse is completed by the release and rotation of the wheels D, D', as hereinbefore described; in this operation, however, the register wheel 10 has again been rotated forward seven teeth, and the clutch 38 between the sleeve 14 of this wheel and the sleeve 32 of the rotating guide disk 27 have engaged, and the guide disk 27 has been rotated forward a distance equal to six teeth on the register wheel 11, which has moved the projection 39 on said guide disk away from the front end of the portion 42 of the fixed guide 22, so that the spring dog 46 engages a tooth of the register wheel 11 exposed at the end of the guide 22. Then when the drawer B' is being closed it rotates the wheels D, D', which carries the shaft 45, upon which said dog 46 is mounted forward, which engages and moves the register wheel 11 forward one tooth, when the dog 46 is thrown out of engagement therewith by contacting with the sloping end of the fixed guide 22, it then continuing its traverse over the portion 42 of said guide, until it contacts with the projection 39 of the rotating disk guide 27, which it carries forward until the dog 46 is thrown out of contact therewith by the raised portion 43 of said fixed guide 22 over which it then passes until the end of its traverse; this movement of the rotating guide disk 27 meanwhile having brought another of the projections 39 thereon over the teeth of the register wheel 11 at the front end of the portion 42 of the fixed guide 22; in this operation, the first register indicating wheel 64 now indicates 6 cents, and the second register indicating wheel 66 has been rotated so as to indicate 1, so that the reading of the two wheels is 16 cents, the sum of the two amounts registered.

The foregoing description is a fair example of the operation of all of the registering wheels, and of the mechanism for carrying tens from each register wheel to the register wheel immediately at the left of it, and further description thereof is deemed unnecessary.

When, however, the operator desires to register any multiple of five cents, for example, thirty-five cents, he presses the 35 cent key, which operates the key lever and mechanism as hereinbefore described, to raise the 35 cent tablet and open the drawer, but operates differently as to the registering of said amount when the said tablet rises. As the projection $h$ thereon passes up under the steps $o$ on th plate O' opposite the second section, it firs contacts with the bar P attached to the plate O opposite the first section, after having raised the plate O a distance equal to two of the steps $o$; the lug $h$ also contacts with the fifth step on the plate O' and raises that plate also, which operates through the lug $p$ thereon engaging with the arm P' secured to the plate O opposite the third section to also raise it a distance equal to the remaining three steps. This has operated through the rack bars N N attached to the plates opposite the first and third sections to rotate the register wheel 10 forward five teeth. This rotation of five teeth of the wheel 10, when added to the six teeth, indicated by the result of the operation hereinbefore described, now equals eleven teeth, which movement of the register wheel 10 has again moved forward the rotating guide disk 27, so as to uncover the teeth of the register wheel 11. Now, when the drawer is again being closed, the pawl 46 engages the teeth of said register wheel 11 and moves it forward one tooth, when it is disengaged therefrom and passes on over the fixed guide as before, carrying the rotating guide with it, as hereinbefore described; now, the thirty-five cents just registered has been added by this operation to the sixteen cents already registered, making a sum total of fifty-one cents, which sum is indicated on the register indicating wheels 64 and 66.

The foregoing description of the operation of the 35 cent key, applies in like manner to all of the keys in the second section, all of which keys represent multiples of five cents, and are in like manner registered.

Having thus fully described convenient mechanism for utilizing my invention, what I claim as new, and desire to secure by Letters Patent of the United States, is—

1. In a cash-register, tablet carriers, register wheels, key levers communicating with and operating to start the tablet carriers upward, and an actuating mechanism adapted to be released by the operation of the key levers, and operating to complete the remainder of the traverse of the tablet carriers, and at the same time actuate the register wheels, substantially as set forth.

2. In a cash-register, tablet carriers, register wheels, a cash drawer, key levers communicating with and operating to start the tablet carriers upward, and an actuating mechanism adapted to be released by the operation of the key levers, and operating to simultaneously complete the remainder of the traverse of the tablet carriers, rotate the register wheels, and open the cash drawer, substantially as set forth.

3. In a cash-register, embodying tablet carriers, register wheels, and a cash-drawer, spring actuated mechanism communicating with and operating to simultaneously raise the tablet carriers, rotate the register wheels, and open the cash-drawer, and key levers operating to start tablet carriers upward, and then release the said actuating mechanism, substantially as described.

4. In a cash-register embodying tablet carriers, register wheels, and a cash-drawer, spring actuated mechanism communicating with and operating to simultaneously raise the tablet carriers, rotate the register wheels, and open the cash-drawer, and key levers operating to start the tablet carriers upward, and then release said actuating mechanism, and carrying mechanism adapted to automatically engage the register wheels, when the movement of the actuating mechanism is reversed by the operation of closing the cash-drawer, substantially as described.

5. In a cash-register, tablet carriers, register wheels, guide and dog register wheel carrying mechanism, adjacent to the register wheels, actuating mechanism communicating with and actuating the tablet carriers and the register wheels when operated in one direction, and also, communicating with and actuating the register wheel carrying mechanism when operated in the opposite direction, and key levers communicating with the tablet carriers and operating to release tablet carriers when raised, to start the tablet carriers up when down, and release said actuating mechanism, substantially as described.

6. In a cash-register, register wheels, tablet carriers and intermediate mechanisms communicating with the register wheels adapted to be engaged by the tablet carriers and thereby operate the register wheels, spring actuated mechanism communicating with and operating to raise the tablet carriers and operate the mechanism communicating therewith, stop mechanism to restrain the operation of said actuating mechanism in one direction, and key levers communicating with the tablet carriers and with said stop mechanism, and operating to start the tablet carriers upward, and to release the stop mechanism from the said actuating mechanism, substantially as described.

7. In a cash-register, register wheels, tablet carriers and intermediate mechanisms communicating with the register wheels adapted to be engaged by the tablet carriers and thereby operate the register wheels, a cash-drawer in the base of the machine frame, spring actuated mechanism communicating with the tablet carriers and with the cash-drawer, operating to raise the tablet carriers and open the cash-drawer, stop mechanism to restrain the operation of the spring actuated mechanism, and key levers communicating with the tablet carriers, and with said stop mechanism, and operating to start the tablet carriers upward, and to release the said stop mechanism from the said actuating mechanism, substantially as described.

8. In a cash-register, register wheels, tablet carriers and intermediate mechanism communicating with the register wheels, adapted to be engaged by the tablet carriers and operate the register wheels when the tablet carriers are being raised, disk guide and dog mechanism adjacent to and communicating with and adapted to operate the register wheels, a cash-drawer in the base of the machine, spring mechanism communicating with and operating to raise the tablet rods and operate the said intermediate mechanism and the register wheels communicating therewith, and communicating with and operating to open the cash-drawer when moving in one direction, and, also, communicating with said disk guide and dog mechanism, and operating when moved in the opposite direction to actuate said disk guide and dog mechanism and the register wheel or wheels engaged thereby, and close the cash-drawer, stop mechanism for engaging the actuating mechanism when the cash-drawer is closed, and key levers operating to start the tablet carriers upward, and release said stop mechanism from the actuating mechanism, substantially as described.

9. In a cash-register, tablet carriers, register wheels, a cash-drawer, tablet and drawer actuating mechanism communicating with the tablet carriers and with the cash-drawer, spring mechanism operating said tablet and drawer actuating mechanism in one direction, during the raising of the tablets and the opening of the cash-drawer, and the closing of the drawer operating said actuating mechanism in the opposite direction and winding up the spring mechanism thereof, stop mechanism for engaging said actuating mechanism when the cash-drawer is closed, and key-levers operating to start the tablet carriers on their upward traverse, and release said stop from the actuating mechanism, substantially as described.

10. In a cash-register, a series of register wheels, rack bar mechanism communicating with, and actuating each of said register wheels, a group of tablet carriers communicating with and actuating each of said sets of rack bar mechanism, a group of keys corresponding to each group of tablet carriers, spring actuated mechanism adapted to be brought into connection with and raise each of said tablet carriers, by the action of any one of the keys, substantially as described.

11. In a cash-register embodying tablet-carriers, register-wheels and key-levers, and mechanism for raising the tablet-carriers and primarily rotating the register wheels to register amounts indicated by the tablet-carriers operated, a separate and independent register wheel carrying mechanism, consisting substantially of a reciprocating rod carrying a series of dogs, one of which is adapted to communicate with and actuate each register wheel, and an actuating mechanism moving said rod subsequent to the primary rotation of the register wheels, so as to produce a secondary and independent movement of said register wheels for carrying amounts from one register wheel to another, substantially as set forth.

12. In a cash-register embodying tablet carriers, register wheels, key levers of different values, and a cash drawer, a register wheel carrying mechanism communicating with the register wheels and operating thereon subsequent to the primary rotation thereof, and intermediate mechanism connecting said register wheel carrying mechanism with the cash drawer, whereby it is actuated by the closing of the cash drawer, substantially as set forth.

13. In a cash-register, register wheels, tablet carriers, a cash drawer, spring actuated gear and lever mechanism operating a radially moving rod for raising the tablet carriers, and also operating to rotate the register wheels and open the cash drawer, and key levers operating to first start the tablet carriers on their upward traverse, and then to release said actuating mechanism, substantially as set forth.

14. In a cash-register, tablet carriers, register wheels actuated by said tablet carriers, a cash-drawer, gear and lever mechanism communicating with and actuating said tablet carriers to raise them, and also actuating the cash-drawer to open it, key levers for starting said tablet carriers upward, and then releasing the said tablet carrier and drawer actuating mechanism, disk guide mechanism adjacent to the register wheels, and dog mechanism traveling over each of the disk guide mechanisms and adapted to engage any register wheel or wheels, whenever the disk guide mechanism adjacent thereto is in such position with relation to the teeth of such register wheel or wheels, as to permit the dog or dogs to engage therewith and move such register wheel or wheels forward, to carry amounts from one register wheel to another, substantially as described.

15. In a cash-register, tablet carriers divided into groups, key levers communicating with said tablet carriers, a stepped plate having a rack bar thereon in front of each group of tablet carriers, a lug on each tablet carrier adapted to engage the stepped plate in front of such tablet carrier, segments of gearing intermeshing with each of the rack bars on said stepped plates, register wheels adjacent to and operated by dogs on said segments, dogs on the machine frame engaging with the register wheels to prevent the backward movement thereof, spring actuated gear and lever mechanism for raising said tablet carriers, after they have been started on their upward traverse, and key levers operating to start the tablet carriers on their upward traverse, and release the said actuating mechanism, substantially as described.

16. In a cash-register, tablet carriers, register wheels, intermediate mechanism communicating movement from the tablet carriers to the register wheels during their upward traverse, key levers communicating with the tablet carriers, spring actuated mechanism adapted to be released by the key levers for raising the tablet carriers, lever mechanism for retaining the tablet carriers in a raised position, and a rod common to all of the key levers adapted to operate said lever mechanism, and thereby release the tablet carriers and allow them to return to their normal positions, substantially as described.

17. In a cash-register, a series of tablet carriers, each having a horizontal slot therein, a series of key levers communicating with said tablet carriers, and adapted to start them upward, a radially moving rod resting normally on all of the tablet carriers in front of the horizontal slots therein, when said tablet carriers are down, and adapted to be started upward in unison with any one of the tablet carriers, by the action of the key lever corresponding thereto, and be thereby engaged with the slot in such tablet-carrier, spring actuated lever mechanism for moving said rod and the tablet carrier so engaged therewith on upward, lever catch mechanism for supporting said rod and tablet-carrier when so raised, and intermediate mechanism communicating with the key levers, whereby the starting upward of the rear end of any of the key levers, operates to disengage said lever catch from said rod and release it, and allow it and the tablet-carrier supported thereby to return to their normal positions, substantially as set forth.

18. In a cash-register, gear wheels mounted on studs on the end frames of the machine, a spring shaft mounted in said end frames and pinions thereon intermeshing with and operating said gear wheels in one direction, a cash-drawer having rack gears thereon intermeshing with said gear wheels, segmental gears on said wheels near the hubs thereof, levers mounted on stud pins on the end frames and having gears thereon intermeshing with said segmental gears on said wheels, a second set of levers mounted on said stud pins beside the first named set of levers, laterally projecting studs on said first named levers adapted to engage the second set of levers, a longitudinal rod connecting the ends of said second set of levers adapted to engage each of the tablet carriers of the machine, and key levers adapted to engage said tablet carriers and start them, together with said rod upward, and then release said gear wheels, substantially as described.

19. In a cash-register, spring actuated gear wheels at the ends of the frame, tablet carriers at the rear of the frame, key levers communicating with said tablet carriers, a rod extending across the ends of all of the key levers, bell-crank levers at each end of the frame communicating with said rod, and a bell-crank lever at one end of the frame engaging with a stop on one of the gear wheels at the end of the frame, and communicating with one of the first named bell-crank levers, so as to be operated thereby, substantially as described.

20. In a cash-register, tablet carriers, key levers communicating with said tablet carriers, spring actuated mechanism adapted to be released by the raising of the rear end of any one of the key levers, so as to start the tablet carrier corresponding thereto on its upward traverse, and automatically carry such tablet carrier on upward the remainder of its traverse, and at the same time open a cash-drawer communicating with said actuated mechanism, and lever catch mechanism communicating with said cash-drawer to prevent such tablet carrier from being lowered until the drawer is fully closed, substantially as described.

21. In a cash-register, a group of tablet carriers, a rod provided with fixed collars at each side of said group of tablet carriers, and loose beveled buttons on said rod between said fixed collars, so arranged thereon that there is only space between them to allow one tablet carrier in said group to be raised at a time, substantially as described.

22. In a cash-register, three or more groups of tablet carriers, a spring actuated rock shaft across the rear of the frame adjacent to said groups of tablet carriers, an upwardly projecting wing on said rock shaft entering notches in all of the tablet carriers in the intermediate one of said groups, and downwardly projecting wings on said rock shaft opposite the groups at each side of said intermediate or central group, and notches in all of the tablet carriers in said outside groups with which said downwardly projecting wings engage when the shaft is rocked by the raising of one of the tablet carriers in said intermediate or central group, substantially as described.

23. In a cash-register, three groups of tablet carriers, a stepped plate in front of each of said groups adapted to be engaged by the tablet carriers of the group behind it, guide racks secured to the two outside plates and communicating by means of intermediate mechanism with register wheels, and a plain guide on the central plate, a horizontal bar secured to the right hand plate and extending across the rear of the central plate opposite the fifth step thereon, and adapted to be engaged by the tablet carriers at the rear of the central plate, and a lug on the back of the upper part of the central plate adapted to engage an arm secured to the left hand plate and extending laterally over said lug, substantially as and for the purpose set forth.

24. In a cash-register, vertically moving tablet carriers mounted in the rear of the machine frame, a rod adapted to be engaged with and raise said tablet carriers, stepped plates secured to vertically moving guide racks in front of and adapted to be engaged and raised by said tablet carriers, backwardly projecting lugs on said guide racks near the upper ends thereof, arms pivoted to the upper part of the end frames of the machine and extending forward and connected together at their ends by a rod passing over the lugs on said guide racks, and links connecting the end of said rod with the ends of the rod operating to raise the tablet carriers, substantially as set forth.

25. In a cash-register, register wheels, mechanism operating to primarily rotate said wheels to register amounts desired, disk guide mechanism adjacent to said register wheels, a reciprocating rod and dog mechanism mounted thereon adapted to travel over said disk guide mechanism, mechanism adapted to operate said rod so that the dogs thereon will engage said register wheels and produce a secondary movement thereof, whenever the disk guides adjacent thereto, are in such position with relation to the teeth on said register wheels, as to permit said dog mechanism to engage with the teeth thereon and move the register wheel forward, substantially as and for the purpose set forth.

26. In a cash-register mechanism for carrying tens from one register wheel to another, register wheels, fixed segmental guides and movable disk guides adjacent to said register wheels, intermediate mechanism connecting each of said movable disk guides with the register wheel at the right hand thereof, and dog mechanism adapted to travel over said guides and register wheels, and engage said register wheels, substantially as described.

27. In a cash-register mechanism for carrying tens from one register wheel to another, register wheels, segmental guide mechanism adjacent to said register wheels, dog mechanism adapted to travel over said guide mechanism and the register wheels and engage the register wheels adjacent thereto, and actuating mechanism operating said dog mechanism to rotate the register wheels during the closing of the cash-drawer of the machine, substantially as described.

28. In a cash-register, register wheels, tablet carriers communicating with and operating said register wheels as said tablet carriers are being raised, mechanism for carrying tens from one register wheel to another, consisting of segmental guides and movable disk guides adjacent to said register wheels, and dog mechanism adapted to travel over said guide mechanism and register wheels and engage the register wheels adjacent thereto, and dog actuating mechanism, adapted to operate said dogs and to move the register wheels, after they have been rotated by the raising of the tablet carriers, substantially as described.

29. In a cash-register, comprising register wheels, vertically moving indicator tablets, and key levers of different values, the combination of such register wheels, and mechanism for primarily rotating said register wheels in response to the operation of the key levers to register amounts corresponding to the values of the key levers operated, with disk guide mechanism adjacent to said register wheels, the movable portion of each of said guide disk mechanism communicating with the register wheel to the right of it, and a reciprocating rod carrying dog mechanism adapted to travel over said guide disk mechanism and engage with any of said register wheels and produce a separate and secondary movement thereof whenever the guide disk mechanism adjacent to such register wheel or wheels has been moved by the register wheel or wheels to the right thereof to such position with relation to the teeth on the adjacent register wheel, as to allow the dog mechanism on said reciprocating rod to engage therewith, substantially as and for the purpose set forth.

30. The combination in a cash-register, of tablet carriers and key levers communicating therewith, register wheels, a cash drawer and intermediate mechanism adapted to operate when a key lever is depressed, with carrying mechanism communicating with the register wheels and operating to rotate them during the closing of the cash drawer, substantially as set forth.

31. In a cash-register, tablet carriers, automatically actuated mechanism for raising said tablet carriers, a cash drawer and lever catch mechanism adapted to engage the mechanism for raising the tablet carriers, and also adapted to be engaged by the cash drawer and be thereby released from the mechanism for raising the tablet carriers, whereby the tablet carriers are retained in a raised position until the cash drawer is closed, substantially as described.

32. In a cash-register, tablet carriers, a cash-drawer, automatic actuating mechanism operating to raise the tablet carriers and open the cash-drawer when moved in one direction, and to close the cash-drawer when moved in the opposite direction, and a reversible escapement dog operating on said actuating mechanism to prevent the reverse movement thereof, before the said actuating mechanism has completed its full traverse in either direction, substantially as described.

33. In a cash-register, a telescopic cash-drawer, consisting of an inner and outer section, mechanism for automatically opening said cash-drawer, lever and stop mechanism connecting the inner and outer sections of said drawer, whereby, when both sections of the drawer are pushed within the case of the machine, the inner section is locked within the outer section of the drawer, and when the outer section of the drawer has moved outward to the end of its traverse, the inner section thereof is released and can be moved on outward, substantially as described.

In testimony whereof I affix my signature in presence of two witnesses.

WILLIAM H. CLARK.

Witnesses:
  F. EINFELDT,
  H. J. CURTZE.